(12) United States Patent
Matsuo

(10) Patent No.: US 10,789,045 B2
(45) Date of Patent: *Sep. 29, 2020

(54) NON-TRANSITORY COMPUTER-READABLE RECORDING MEDIUM STORING COMPUTER-READABLE INSTRUCTIONS FOR CAUSING INFORMATION PROCESSING DEVICE TO EXECUTE COMMUNICATION PROCESSING WITH IMAGE PROCESSING PROGRAM AND VOICE-RECOGNITION PROGRAM, INFORMATION PROCESSING DEVICE, AND METHOD OF CONTROLLING INFORMATION PROCESSING DEVICE

(71) Applicant: BROTHER KOGYO KABUSHIKI KAISHA, Nagoya-shi, Aichi (JP)

(72) Inventor: Yu Matsuo, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,448

(22) Filed: Dec. 2, 2019

(65) Prior Publication Data

US 2020/0104097 A1 Apr. 2, 2020

Related U.S. Application Data

(63) Continuation of application No. 16/425,506, filed on May 29, 2019, now Pat. No. 10,496,367, which is a (Continued)

(30) Foreign Application Priority Data

Mar. 31, 2017 (JP) .................................. 2017-070696

(51) Int. Cl.
G06F 3/16 (2006.01)
G10L 15/26 (2006.01)
H04N 1/00 (2006.01)

(52) U.S. Cl.
CPC .............. *G06F 3/167* (2013.01); *G10L 15/26* (2013.01); *G10L 15/265* (2013.01);
(Continued)

(58) Field of Classification Search
CPC ....... G06F 3/167; G10L 15/26; G10L 15/265; H04N 1/00403; H04N 1/00493; H04N 2201/0094
(Continued)

(56) References Cited

U.S. PATENT DOCUMENTS 8,694,323 B2 4/2014 Hataoka et al.
10,318,237 B2 6/2019 Matsuo
(Continued)

FOREIGN PATENT DOCUMENTS

JP 2014-222517 A 11/2014

OTHER PUBLICATIONS

Office Action dated Sep. 20, 2018 received in related U.S. Appl. No. 15/925,911.
(Continued)

*Primary Examiner* — Allen H Nguyen
(74) *Attorney, Agent, or Firm* — Scully, Scott, Murphy & Presser, PC

(57) ABSTRACT

A non-transitory computer-readable recording medium storing computer-readable instructions may be read by a controller of an information processing device in which an image processing program and a voice-recognition program have been installed. The computer-readable instructions may cause the information processing device to obtain the text data from the voice-recognition program in a case where
(Continued)

the voice-recognition program creates the text data. The computer-readable instructions may cause the information processing device to determine whether the obtained text data includes a first string and a second string. The computer-readable instructions may cause the information processing device to cause a display of the information processing device to display a specific image in a case where it is determined that the text data includes the first string and the second string. The computer-readable instructions may cause the information processing device to instruct the image processing program to execute image processing.

15 Claims, 4 Drawing Sheets

Related U.S. Application Data continuation of application No. 15/925,911, filed on Mar. 20, 2018, now Pat. No. 10,318,237.

(52) U.S. Cl.
CPC ..... *H04N 1/00403* (2013.01); *H04N 1/00493* (2013.01); *H04N 2201/0094* (2013.01)

(58) Field of Classification Search
USPC ........................................... 358/1.13
See application file for complete search history.

(56) References Cited

U.S. PATENT DOCUMENTS

| | | |
|---|---|---|
| 2004/0189791 A1 | 9/2004 | Haruki |
| 2007/0185704 A1 | 8/2007 | Yoshimura et al. |
| 2010/0197283 A1 | 8/2010 | Yamamoto |
| 2012/0016678 A1 | 1/2012 | Gruber et al. |
| 2013/0191125 A1* | 7/2013 | Suzuki .................. G10L 15/26 704/235 |
| 2015/0058011 A1 | 2/2015 | Morita et al. |
| 2015/0116784 A1 | 4/2015 | Nakayama |
| 2016/0035351 A1* | 2/2016 | Sendai ................ G02B 27/017 704/275 |
| 2016/0109944 A1* | 4/2016 | Hiramoto ............... G06F 3/013 701/461 |
| 2016/0210276 A1 | 7/2016 | Kawano et al. |
| 2016/0292898 A1 | 10/2016 | Ooshima |
| 2016/0379626 A1 | 12/2016 | Deisher et al. |
| 2018/0018755 A1* | 1/2018 | Fujiyama ............. G06F 3/0416 |

OTHER PUBLICATIONS

Notice of Allowance dated Feb. 1, 2019 received in related U.S. Appl. No. 15/925,911.
Notice of Allowance dated Aug. 5, 2019 received in related U.S. Appl. No. 16/425,506.

* cited by examiner

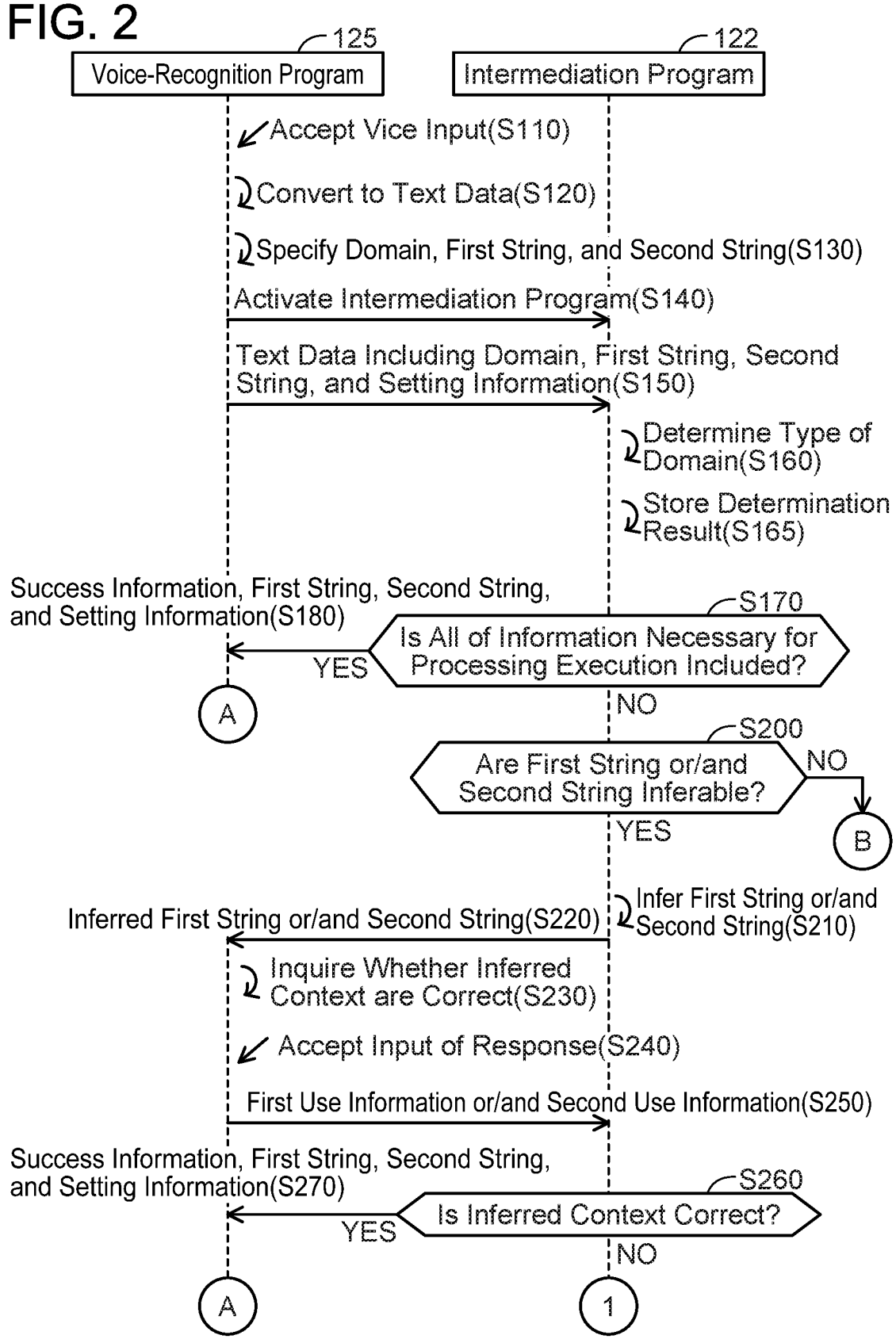

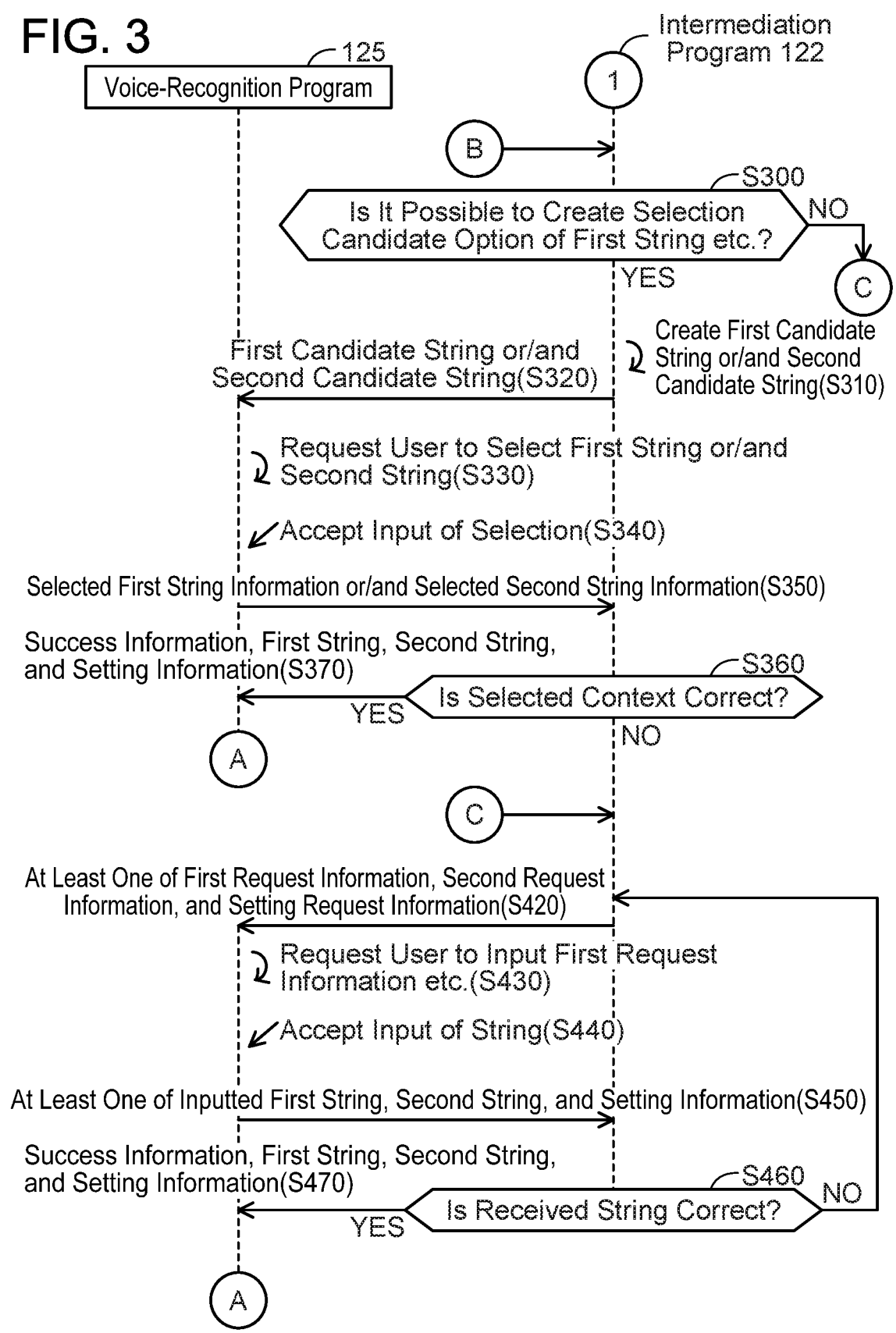

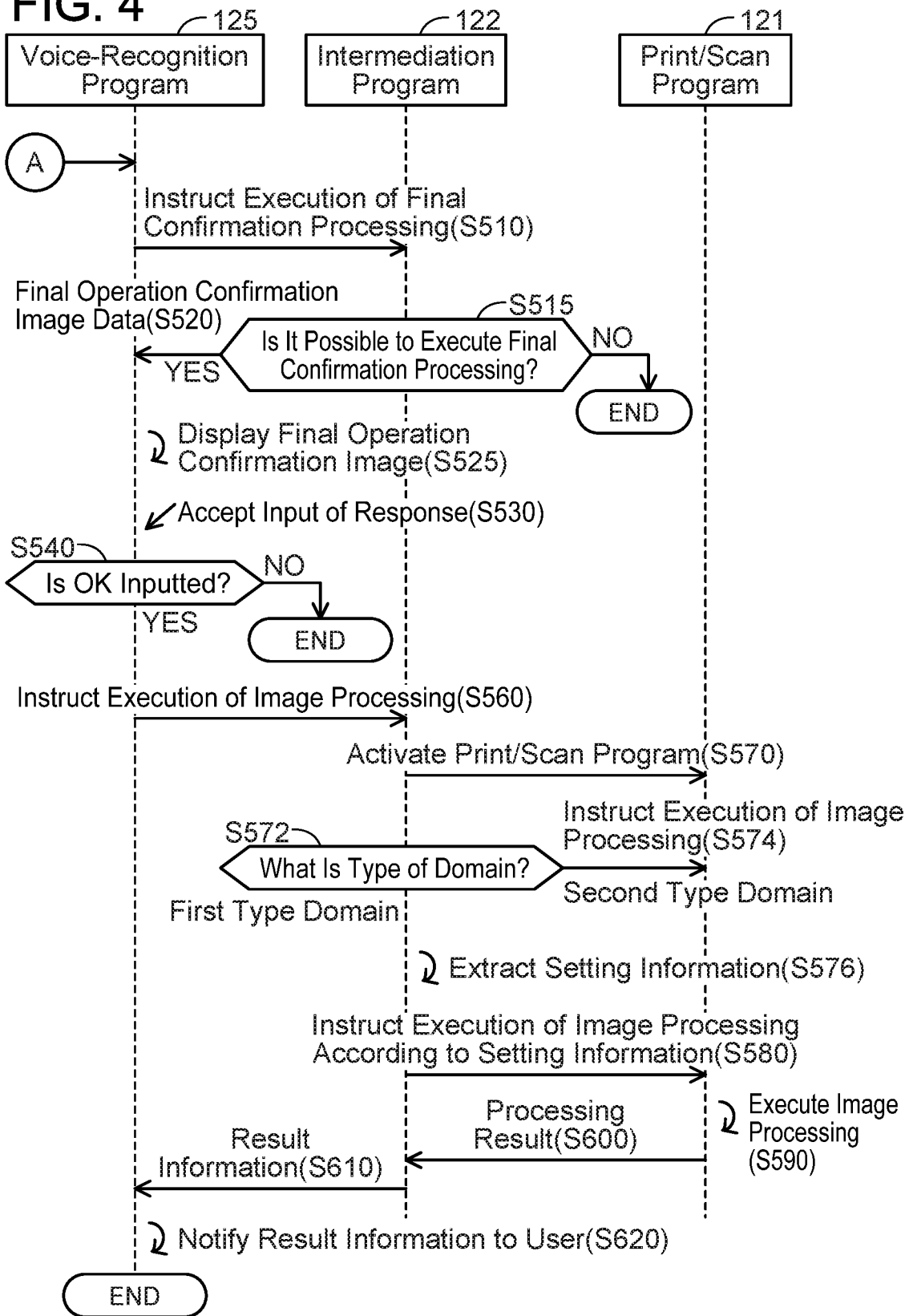

NON-TRANSITORY COMPUTER-READABLE RECORDING MEDIUM STORING COMPUTER-READABLE INSTRUCTIONS FOR CAUSING INFORMATION PROCESSING DEVICE TO EXECUTE COMMUNICATION PROCESSING WITH IMAGE PROCESSING PROGRAM AND VOICE-RECOGNITION PROGRAM, INFORMATION PROCESSING DEVICE, AND METHOD OF CONTROLLING INFORMATION PROCESSING DEVICE

CROSS-REFERENCE TO RELATED APPLICATION

This application is a continuation application of U.S. patent application Ser. No. 16/425,506 filed on May 29, 2019 which is a continuation application of U.S. patent application Ser. No. 15/925,911 filed on Mar. 20, 2018, now U.S. Pat. No. 10,318,237 issued on Jun. 11, 2019 and claims priority under 35 U.S.C. § 119 from Japanese Patent Application No. 2017-070696 filed on Mar. 31, 2107. The entire subject matter of each of the applications is incorporated herein by reference.

TECHNICAL FIELD

The technique disclosed herein relates to an information processing program for causing an information processing device to execute various types of image processing.

BACKGROUND ART

A voice assistant program by which a computer is capable of interpreting user's dialogues and of executing various operations that are orally instructed is known.

SUMMARY

There is a case where it is desirable to orally instruct an image processing program for executing various types of image processing to execute image processing that a user selected. The description herein discloses a novel technique that enables to orally instruct an image processing program to execute a process via a voice assistance program.

A non-transitory computer-readable recording medium storing computer-readable instructions disclosed herein may be read by a controller of an information processing device in which an image processing program and a voice-recognition program have been installed. The image processing program and the voice-recognition program may have a format interpretable by the controller of the information processing device. The image processing program may be for executing image processing. The voice-recognition program may be for converting a voice inputted via a microphone of the information processing device to text data. The computer-readable instructions, when executed by the controller of the information processing device, may cause the information processing device to obtain the text data from the voice-recognition program in a case where the voice-recognition program creates the text data. The computer-readable instructions may cause the information processing device to determine whether the obtained text data includes a first string indicating the image processing program and a second string indicating a content of image processing to be executed by the image processing program. The computer-readable instructions may cause the information processing device to cause a display of the information processing device to display a specific image indicating a context of image processing indicated by the second string in a case where it is determined that the text data includes the first string and the second string. The computer-readable instructions may cause the information processing device to instruct the image processing program indicated by the first string to execute image processing indicated by the second string in a case where an execution instruction is accepted.

BRIEF DESCRIPTION OF THE DRAWINGS

FIG. 2 shows an operational sequence diagram of the communication system.

FIG. 3 shows an operational sequence diagram of the communication system.

FIG. 4 shows an operational sequence diagram of the communication system.

EMBODIMENTS (Configuration of Communication System 10)

Figure 1:
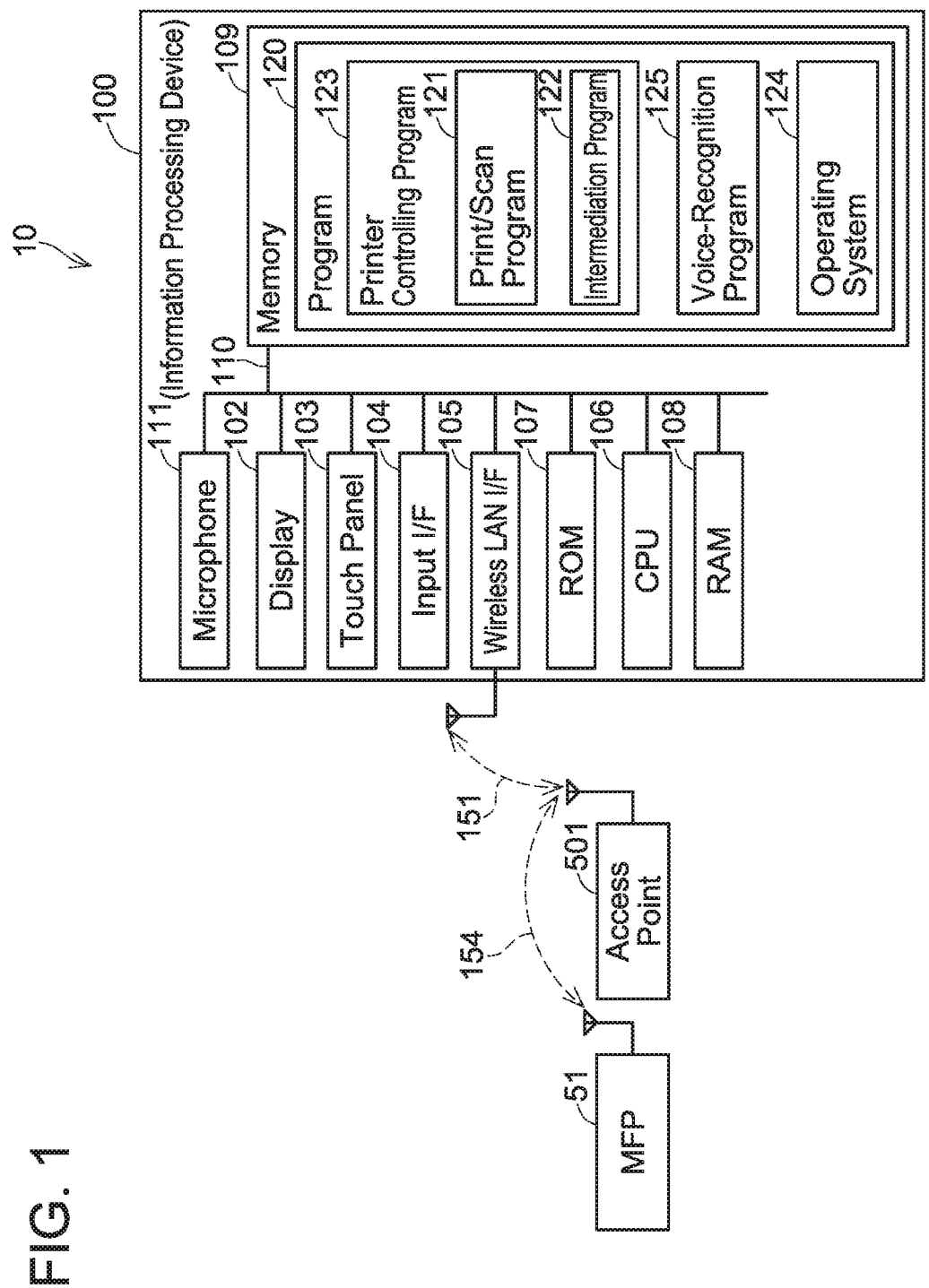
FIG. 1 shows a configuration of a communication system.

FIG. 1 is a block diagram showing a configuration of a communication system 10. The communication system 10 includes an information processing device 100 and an MFP 51. Here, an MFP is a multifunction peripheral provided with a print function, a scan function, a copy function, and the like.

The information processing device 100 is a portable device such as a cell phone or a portable terminal. The information processing device 100 includes a display 102, a touch panel 103, an input I/F 104, a wireless LAN_I/F 105, a CPU 106, a ROM 107, a RAM 108, a memory 109, a microphone 111, and the like, and these members are connected to each other via an input/output port 110. I/F is an abbreviation of "Interface".

The display 102 is configured to receive image signals outputted from the CPU 106, and display an image based on the received image signals. As the display 102, for example, an LCD (which may be termed Liquid Crystal Display), an organic EL (which may be termed Organic Electro-Luminescence) panel, may be used. The touch panel 103 is constituted of a transparent member, and is arranged to cover a surface of the display 102. The touch panel 103 is configured to detect a position that is touched by a user's finger or the like, and to output detected position information to the CPU 106. The input I/F 104 may for example be operation buttons.

The wireless LAN_I/F 105 is an I/F configured to perform communications as a wireless LAN station. The wireless LAN_I/F 105 is configured to perform a communication complying with an infrastructure mode of Wi-Fi (registered trademark of Wi-Fi Alliance), and a communication complying with Wi-Fi Direct (registered trademark of Wi-Fi Alliance). The wireless LAN_I/F 105 is configured to communicate various types of data with the MFP 51 through wireless communications 151 and 154 and an access point 501.

The CPU 106 is configured to execute programs stored in the memory 109. The RAM 108 temporarily stores information necessary for processing in the CPU 106. The memory 109 is configured by combining a flash memory, a HDD (which may be termed hard disk), a buffer in the CPU 106, and the like. The memory 109 is configured to store image data, text data, and the like.

The memory 109 stores programs 120. The CPU 106 executes processing according to the programs 120. The memory 109 may be a computer-readable storage medium. The computer-readable storage medium is a non-transitory medium, such as a ROM, a RAM, a flash memory, a hard disk, and the like.

The programs 120 include printer controlling programs 123, a voice-recognition program 125, and an operating system 124 (hereinbelow also described as OS 124). The printer controlling programs 123 include a print/scan program 121 and an intermediation program 122.

The print/scan program 121 is a program for causing the MFP 51 to execute various types of image processing, such as a print process or a scan process. Further, the print/scan program 121 can create image data to be used in the print process and send the same, and receive image data created in the MFP 51 in the scan process. In an explanatory example of this embodiment, a case is described in which a name of the print/scan program 121 is "print/scan app".

The intermediation program 122 is a program for enhancing functions of the print/scan program 121. That is, the intermediation program 122 is a program having a plugin function for the print/scan program 121. The intermediation program 122 has a function to intermediate communications of various types of information between the print/scan program 121 and the voice-recognition program 125. The intermediation program 122 may be executed by being called by the voice-recognition program 125 or the print/scan program 121.

The voice-recognition program 125 is configured to convert a voice that the user inputted through the microphone 111 to text data by using a voice recognition technique. Further, the voice-recognition program 125 is configured to interpret context of the converted text data by using natural language processing. Due to this, various oral instructions can be accepted, and processes according to those instructions can be executed. Examples of the voice-recognition program 125 are Siri (registered trademark of Apple Inc.), and Cortana (registered trademark of Microsoft Corporation).

The OS 124 is a program that provides basic functions utilized commonly among the intermediation program 122, the print/scan program 121, and the like. In this embodiment, an example is given in which the OS 124 is iOS (registered trademark of Cisco Systems). The intermediation program 122, the print/scan program 121, the voice-recognition program 125, and the like output various instructions to the OS 124 by using an API provided by the OS 124. That is, the voice-recognition program 125, the print/scan program 121, and the like give instructions to the respective members of the information processing device 100 via the OS 124. A result for each instruction is outputted from the OS 124 to a relevant one of the voice-recognition program 125, the print/scan program 121, and the like.

Hereinbelow, the CPU 106 executing a program such as the intermediation program 122, the voice-recognition program 125, or the like may in some cases be referred to simply by the program name. For example, "the intermediation program 122" may mean "the CPU 106 executing the intermediation program 122".

Further, the memory 109 has pre-stored therein first comparison strings, second comparison strings, a plurality of first candidate strings, and a plurality of second candidate strings. Contexts of these letter strings will be described later. The first and second comparison strings may be created by a creator of the intermediation program 122, and may be stored in the memory 109 when the intermediation program 122 is installed. The first and second candidate strings may be stored in the memory 109 by the user.

(Operation of Communication System)

An operation of the communication system 10 will be described with reference to sequence diagrams of FIGS. 2 to 4. In the explanatory example of this embodiment, a case in which the voice-recognition program 125 is "Siri" will be described.

An in-advance preparation for constructing the communication system 10 will be described. A creator of the print/scan program 121 includes a declaration string in codes of the print/scan program 121, where the declaration string declares that this program is communicable with the voice-recognition program 125. The creator uploads the print/scan program 121 and the intermediation program 122 to a server that is not shown. The user downloads the print/scan program 121 and the intermediation program 122 from the server, and installs them to the information processing device 100. The OS 124 identifies that the voice-recognition program 125 and the print/scan program 121 are in a cooperating relationship by detecting the declaration string in the print/scan program 121. This enables the intermediation program 122 to intermediate communications between the voice-recognition program 125 and the print/scan program 121.

When the voice-recognition program 125 is activated in the information processing device 100, the flow of FIG. 2 is started. In S110, the voice-recognition program 125 accepts a voice input from the microphone 111. In S120, the voice-recognition program 125 executes a conversion process to convert the voice input to text data. In S130, the voice-recognition program 125 interprets the text data. Then, it specifies a domain, a first string, and a second string.

The domain is information that defines a task executable by the voice-recognition program 125. There are plural types of domains. Further, for each type of the domain, a rule for using this domain is set. Examples of the domain include a "send message", a "workout", a "picture search", and the like. The "send message" is a domain that sends a message using an email. An example of the rule for using the domain "send message" may be that a letter string "send message" is included in the inputted voice. The "workout" is a domain that notifies a progress during a workout. An example of the rule for using the domain "workout" may be that a letter string "start" is included in the inputted voice. The "picture search" is a domain that searches for desired picture data from among a plurality of picture data stored in the memory 109.

As the domain, there are a first type domain and a second type domain. The first type domain is a domain in which a process content can be designated, and the second type domain is a domain in which a process content cannot be designated. As an example of a configuration for designating the process content, a configuration for designating setting information to be used in the image processing may be exemplified. As examples of the setting information, a paper size, a printing resolution, a setting regarding color print or black and white print, a scan resolution, and the like may be exemplified. That is, the first type domain is a domain indicating the setting information to be used in the image processing is included in text data. Further, the second type domain is a domain indicating that the setting information to be used in the image processing is not included in the text data. As an example of the first type domain, "send message" can be exemplified. As an example of the second type domain, "workout" can be exemplified.

The first string is a letter string for identifying the print/scan program 121. The first string may be a name or an abbreviated name of the print/scan program 121. The second string is a letter string indicating a content of the image processing to be executed by the print/scan program 121. As examples of the second string, "print", "scan", and the like may be exemplified.

In the explanatory example of this embodiment, a case is described in which a voice input "send a message to use print/scan app to print in A4 size" is accepted in S110. In this case, since the letter string "send a message" is included in the inputted voice, the domain thereof is identified as "send message". As the first string, "print/scan app" is identified. As the second string, "print" is identified. Since the domain is "send message", it is determined that the setting information can be designated. Then, "A4" is identified as the setting information.

When at least one of the domain, first string, and the second string is not identified in S130, the voice-recognition program 125 may ask the user about the domain or the letter string which it could not identify. Further, in a case where the setting information cannot be identified though the setting information can be designated (that is, in the case of the first type domain), the voice-recognition program 125 may or may not ask the user about the setting information.

In S140, the voice-recognition program 125 activates the intermediation program 122. In S150, the voice-recognition program 125 sends the text data including the domain, the first string, and the second string to the intermediation program 122. When the domain is the first type domain, the text data includes the setting information as well. In the explanatory example of this embodiment, text data including the domain "send message", the first string "print/scan app", the second string "print", and the setting information "A4" is sent.

In S160, the intermediation program 122 determines the type of the domain included in the received text data. In this explanatory example of this embodiment, it is determined that the domain is "send message". In S165, the intermediation program 122 temporarily stores a determination result of the domain in the memory 109.

S170, the intermediation program 122 determines whether or not all of information necessary for instructing the print/scan program 121 to execute the image processing is included in the text data received in S150. Specifically, when the domain is determined in S160 as being the second type domain, it is herein determined whether the first string and the second string are included. On the other hand, when the domain is determined in S160 as being the first type domain, it is herein determined whether the setting information is included in addition to whether the first string and the second string are included. When an affirmative determination is made (YES in S170), the intermediation program 122 proceeds to S180.

In S180, the intermediation program 122 sends success information, the first string, the second string, and the setting information to the voice-recognition program 125. The success information is information that indicates that all of the information necessary for instructing the print/scan program 121 to execute the image processing has been obtained. When the domain is the second type domain, the setting information is not sent.

On the other hand, in S170, when a negative determination is made (NO in S170), the intermediation program 122 proceeds to S200. In S200, the intermediation program 122 determines whether or not the first string or/and the second string are inferable. Specifically, a determination is made on whether a first similar character string similar to the first string or/and a second similar character string similar to the second string are included in the text data. The first and second similar character strings are letter strings that are created when the user says a phrase wrong, or the voice recognition fails. As examples of the first similar character strings for a case where the first string is "print/scan app", "print app", "scan app", and the like may be exemplified. Further, as an example of the second similar character strings for the failure of the voice recognition, "print 'o scan apple" may be exemplified.

The determination in S200 may be executed by using first comparison strings and second comparison strings that are stored beforehand in the memory 109. As an example of the first comparison strings, "print/scan app", which is the name of the print/scan program 121, may be exemplified. As examples of the second comparison strings, "print" and "scan" may be exemplified.

In S200, when an affirmative determination is made (YES in S200), the intermediation program 122 proceeds to S210. In S210, the intermediation program 122 infers the first string based on the first similar character string when the first similar character string is included in the text data. Specifically, it infers that the first string is identical to the first comparison string corresponding to the first similar character string. For example, when the first similar character string is "print app", the first string is inferred as being identical to "print/scan app", which is the first comparison string. Further, when the second similar character string is included in the text data, it infers the second string based on the second similar character string. Specifically, it infers that the second string is identical to the second comparison string corresponding to the second similar character string.

In S220, the intermediation program 122 sends the first string or/and the second string inferred in S210 to the voice-recognition program 125.

In S230, the voice-recognition program 125 inquires the user as to whether or not the inferred first string or/and second string are correct. This inquiry to the user may be executed by at least one of voice output and screen display. For example, when the first similar character string is "print app", a phrase "did you mean "print/scan app", instead of "print app"?" may be read by voice, and may further be displayed in the displayed screen of the voice-recognition program 125.

In S240, the voice-recognition program 125 accepts an input of a response from the user. The input acceptance of the response may be executed by receiving a voice input of "yes" or "no" through the microphone 111.

In S250, the voice-recognition program 125 creates first use information or/and second use information, and sends the same to the intermediation program 122. The first use information is information indicating whether or not the first string is usable. When the response that the inferred first string is correct is accepted in S240, the first use information in this case includes a content indicating that the inferred first string can be used. On the other hand, when the response that the inferred first string is incorrect is accepted in S240, the first use information in this case includes a content indicating that the inferred first string cannot be used. Similarly, the second use information is information indicating whether or not the second string is usable.

In S260, the intermediation program 122 determines whether or not the first use information or/and the second use information indicate whether the inferred first string or/and second string are usable. When an affirmative determination is made (YES in S260), the intermediation program 122 proceeds to S270. A content of the process in S270 is identical to that of aforementioned S180.

On the other hand, in S260, when a negative determination is made (NO in S260), the intermediation program 122 proceeds to S300. In S300, the intermediation program 122 determines whether or not it is possible to create a plurality of selection candidates for the first string or/and the second string. This determination may be executed for example according to whether or not a plurality of first candidate strings that are to be candidates of the first string and a plurality of second candidate strings that are to be candidates of the second string are stored in the memory 109. As examples of the plurality of first candidate strings, "print/scan app", "browser app", and the like may be exemplified. As examples of the plurality of second candidate strings, "print", "scan", and the like may be exemplified.

In S300, when an affirmative determination is made (YES in S300), the intermediation program 122 proceeds to S310. In S310, the intermediation program 122 creates a plurality of first candidate strings or/and a plurality of second candidate strings. Specifically, it may read out the plurality of first candidate strings or/and the plurality of second candidate strings stored in the memory 109, for example.

In S320, the intermediation program 122 sends the plurality of first candidate strings or/and the plurality of second candidate strings created in S310 to the voice-recognition program 125.

In S330, the voice-recognition program 125 requests the user to select one first string or/and second string from the plurality of first candidate strings or/and the plurality of second candidate strings. This request to the user may be performed by at least one of the voice output and the screen display. For example, when there is the plurality of second candidate strings, a phrase "Which one of "print" and "scan" would you like to proceed with?" may be read out by the voice, and may be displayed in the displayed screen of the voice-recognition program 125.

In S340, the voice-recognition program 125 accepts an input of the user's selection. The selection input acceptance may for example be performed by receiving a voice input "print" through the microphone 111.

In S350, the voice-recognition program 125 creates selected first string information or/and selected second string information and send the same to the intermediation program 122. The selected first string information is information indicating a selected first string that was selected by the user from among the plurality of first candidate strings. The selected second string information is information indicating a selected second string that was selected by the user from among the plurality of second candidate strings.

In S360, the intermediation program 122 determines whether or not the selected first string or/and the selected second string are correct. Specifically, it determines whether the selected first string is indicating the name of the print/scan program 121, and the selected second string is indicating the image processing executable by the print/scan program 121. For example, when the print/scan program 121 cannot execute a FAX processing but the selected second string is "FAX", a determination is made that the selected second string is incorrect. When an affirmative determination is made (YES in S360), the intermediation program 122 proceeds to S370. The process content in S370 is similar to the content of S180 as aforementioned.

On the other hand, in S360, when a negative determination is made (NO in S360), the intermediation program 122 proceeds to S420. In S420, the intermediation program 122 sends at least one of first request information, second request information, and setting request information to the voice-recognition program 125. Each of the first request information, the second request information, and the setting request information is information for instructing the voice-recognition program 125 to execute a process to request the user to input corresponding one of the first string, the second string, and the setting information.

In S430, the voice-recognition program 125 requests the user to input at least one of the first string, the second string, and the setting information. The request to the user may be performed by at least one of the voice output and the screen display. For example, when the second string is "print" and the input of the setting information is to be requested, a phrase "Please input the paper size for the print." may be read out by voice, and may be displayed in the displayed screen of the voice-recognition program 125.

In S440, the voice-recognition program 125 accepts the input of the first string and the like from the user. The acceptance of inputs such as the first string may for example be performed by receiving a voice input through the microphone 111. In S450, the voice-recognition program 125 sends the at least one of the first string, the second string, and the setting information inputted in S440 to the intermediation program 122.

In S460, the intermediation program 122 determines whether or not at least one of the received first string, second string, and setting information is correct. Specific contents of this determination are same as the contents of S360 as aforementioned. When a negative determination is made (NO in S460), the intermediation program 122 returns to S420, and when an affirmative determination is made (YES in S460), the intermediation program 122 proceeds to S470. A process content of S470 is same as the content of S180 as aforementioned.

When the process of S180, S270, S370, or S470 is executed, the voice-recognition program 125 proceeds to S510. In S510, the voice-recognition program 125 instructs the intermediation program 122 to execute a final confirmation processing. The final confirmation process is a process to confirm with the user whether the image processing instructed by the user should be executed by the print/scan program 121.

In S515, the intermediation program 122 determines whether or not the final confirmation processing is ready to be executed. For example, it determines whether or not all of the information necessary for instructing the print/scan program 121 to execute the image processing are not missing. When a negative determination is made (NO in S515), the intermediation program 122 ends the process flow, and when an affirmative determination is made (YES in S515), the intermediation program 122 proceeds to S520.

In S520, the intermediation program 122 sends final operation confirmation image data to be used for causing the voice-recognition program 125 to display a final operation confirmation image to the voice-recognition program 125. The final operation confirmation image is an image for inquiring the user whether or not the image processing indicated by the second string should be executed by the print/scan program 121.

In S525, the voice-recognition program 125 causes the final operation confirmation image to be displayed in the display 102. In the explanatory example of this embodiment, a case is described in which a phrase "Are you sure you want to execute A4 size printing using the print/scan app?" is displayed in the displayed screen of the voice-recognition program 125.

In S530, the voice-recognition program 125 accepts an input of a user response. The input acceptance of the response may be executed by receiving a voice input of "yes" or "no" through the microphone 111. In S540, the voice-recognition program 125 determines whether or not a response to allow the execution of the image processing is inputted. When a negative determination is made (NO in S540), the voice-recognition program 125 ends the process, and when an affirmative determination is made (YES in S540), the voice-recognition program 125 proceeds to S560. In S560, the voice-recognition program 125 instructs the intermediation program 122 to execute the image processing. In S570, the intermediation program 122 activates the print/scan program 121.

In S572, the intermediation program 122 determines whether the domain being currently used is the first type domain that can designate the process content or the second type domain that cannot designate the process content. This determination can be executed by using the determination result stored in the memory 109 in S165. When it is determined that the domain is the second type domain (Second Type Domain in S572), the intermediation program 122 proceeds to S574. In S574, the intermediation program 122 instructs the print/scan program 121 to execute the image processing indicated by the second string. In the explanatory example of this embodiment, the case of instructing to execute the print process is described.

On the other hand, when it is determined that the domain being currently used is the first type domain (First Type Domain in S572), the intermediation program 122 proceeds to S576. In S576, the intermediation program 122 extracts the setting information. In S580, the intermediation program 122 instructs the print/scan program 121 to execute the image processing indicated by the second string according to the setting information extracted in S576. In the explanatory example of this embodiment, the case of instructing to execute the print process in "A4 size" is described.

In S590, the print/scan program 121 executes the image processing indicated by the second string. At this occasion, the image data to be the execution target of the image processing may be selected by the user. Further, the selected image data may be sent to the MFP 51 via the wireless communications 151, 154 to cause the MFP 51 to execute the image processing thereon. In the explanatory example of this embodiment, the print process may be executed on a print paper of the A4 size when the user sends the selected image data to the MFP 51.

In S600, the intermediation program 122 receives result information indicating a result of the execution of the image processing indicated by the second string from the print/scan program 121. This result of the execution may include success/failure of the image processing, presence/absence of errors, and the like, for example. In S610, the intermediation program 122 sends the result information to the voice-recognition program 125. In S620, the voice-recognition program 125 notifies the result information to the user. This notification to the user may be executed by at least one of the voice output and the screen display. For example, a phrase "The print process by the print/scan app is completed." may be read out by voice, and may be displayed in the displayed screen of the voice-recognition program 125.

(Effects)

The intermediation program 122 can obtain the first string indicating the print/scan program 121 and the second string indicating the content of the image processing from the voice-recognition program 125 (S150). Further, the intermediation program 122 can instruct the print/scan program 121 to execute the image processing indicated by the second string (S574, S580). Due to this, the instruction of the execution of the image processing using a voice to the print/scan program 121 via the voice-recognition program 125 is enabled.

The intermediation program 122 can cause the final operation confirmation image to be displayed by the voice-recognition program 125 (S525) by sending the final operation confirmation image data to the voice-recognition program 125 (S520). Further, when the execution instruction for the image processing from the user is accepted (YES in S540), it can instruct the print/scan program 121 to execute the image processing (S574, S580). Due to this, the final denial or approval of the execution of the image processing can be confirmed with the user.

The intermediation program 122 can cause the voice-recognition program 125 to output the processing result (S620) by receiving the result information indicating the execution result of the image processing from the print/scan program 121 (S600), and sending the received result information to the voice-recognition program 125 (S610). Due to this, the execution result of the image processing can be notified to the user by using at least one of the voice and the screen display.

When the first string or/and second string are not included in the text data (NO in S170) but the first similar character string or/and second similar character string are included in the text data (YES in S200), the intermediation program 122 can infer the first string or/and second string (S210). Further, the voice-recognition program 125 can be caused to execute the process to inquire the user regarding whether the inferred first string or/and second string are usable (S220 to S250). Due to this, the correct first string or/and second string can be obtained even when the user had incorrectly remembered the name of the print/scan program 121, or a part of the text data came to include an error due to a recognition failure by the voice-recognition program 125.

When the first string or/and second string are not included in the text data (NO in S170), the intermediation program 122 can create a plurality of first candidate strings or/and plurality of second candidate strings (S310). Further, the voice-recognition program 125 can accept the user operation to select the selected first string or/and selected second string from among the plurality of first candidate strings or/and plurality of second candidate strings (S320 to S350). Since the selection can be accepted after having presented choices thereof to the user, convenience for the user can be improved.

When the first string or/and second string are not included in the text data (NO in S170), the intermediation program 122 can cause the voice-recognition program 125 to execute the process of requesting the user to input the first string or/and second string (S420 to S450). Due to this, the user can input the first string or/and second string by voice (S440). As compared to the case of inputting the first string or/and second string using the touch panel 103, burden on the user can be reduced.

The intermediation program 122 can determine whether or not the setting information is included in the text data (S170) based on the domain obtained from the voice-recognition program 125 in S150 (S150). When the determination is made that the text data includes the setting information (First Type Domain in S572), the setting information can be extracted (S576). Then, the print/scan program 121 can be instructed to execute the image processing according to the extracted setting information (S580). Due to this, the print/scan program 121 can be caused to execute the image processing according to the setting information accepted via the voice-recognition program 125.

(Modified Examples)

In S520, the intermediation program 122 may send the final operation confirmation image data to the print/scan program 121. Further, the print/scan program 121 may display the final operation confirmation image in the display 102. Further, the intermediation program 122 itself may display the final operation confirmation image in the display 102.

In S210, the intermediation program 122 may infer the setting information. Further, the intermediation program 122 may send the inferred setting information to the voice-recognition program 125 (S220), and may receive the information indicating whether or not the inferred setting information is usable (S250).

In S310, the intermediation program 122 may create a plurality of candidate setting information that are to be candidates of the setting information. Further, the intermediation program 122 may send the plurality of candidate setting information to the voice-recognition program 125 (S320), and may receive information indicating the setting information selected by the user (S350).

N sets of intermediation programs may exist to correspond to each of N sets (where N is a natural number of 1 or more) of domains. For example, an intermediation program corresponding to the domain for "send message", an intermediation program corresponding to the domain for "workout", and an intermediation program corresponding to the domain for "picture search" may exist. In this case, the voice-recognition program 125 may activate the intermediation program in S140 corresponding to the domain identified in S130. Further, the processes of S160 and S165 may be omitted.

The present disclosure is not limited to a configuration in which the intermediation program 122 activates the print/scan program 121 (S570). In S560, the voice-recognition program 125 may activate the print/scan program 121.

The processes for inferring the first string and the like (S200 to S270) may be omitted. The processes for creating the choices for the first string and the like (S300 to S370) may be omitted. The processes for requesting the user to input the first string and the like (S420 to S470) may be omitted. The final confirmation process (S510 to S540) may be omitted. The processes for reporting the image processing result to the user using the voice-recognition program 125 (S600 to S620) may be omitted. According to the above, to describe in general terms, the intermediation program 122 simply needs to cause an information processing device to execute at least obtaining text data from the voice-recognition program in a case where the voice-recognition program creates the text data; determining whether the obtained text data includes a first string indicating the image processing program and a second string indicating a content of image processing to be executed by the program; causing a display of the information processing device to display a specific image indicating a context of image processing indicated by the second string in a case where it is determined that the text data includes the first string and the second string; and instructing the image processing program indicated by the first string to execute image processing indicated by the second string in a case where an execution instruction is accepted. As a specific example, the intermediation program 122 simply needs to execute at least S150, S170, S520, S574, and S580.

How the processes are distributed between the print/scan program 121 and the intermediation program 122 described in the embodiment is a mere example, and they may be given other distribution patterns. For example, a part of the processes executed by the intermediation program 122 may be executed by the print/scan program 121.

The domains, such as "send message" described in this disclosure are mere examples. The technique of the present disclosure may be applied to other types of domains.

The image processing executed by the print/scan program 121 is not limited to "print" and "scan". The technique of the present disclosure may be applied even when other types of image processing are to be executed.

In the present embodiment, the MFP 51 is described as an example of a device for executing the image processing, however, no limitation is made hereto. It may be a label printer, a scanner, a copier, and the like.

In the above embodiment, the CPU 106 of the information processing device 100 executes the programs 120 in the memory 109 to realize the respective processes in FIGS. 2 to 4. Instead of this, at least one of the processes in FIGS. 2 to 4 may be implemented by hardware such as a logic circuit, an integrated circuit, and the like.

The CPU 106 is an example of a controller. The intermediation program 122 is an example of a computer-readable instructions. The print/scan program 121 is an example of an image processing program. Print and scan are examples of image processing. The CPU executing S150 is an example of "obtain text data from a voice-recognition program in a case where the voice-recognition program creates the text data". The "print/scan app", which is the name of the print/scan program 121, is an example of a first string. "Print" and "Scan" are examples of a second string. The CPU executing S170 is an example of "determining whether the obtained text data includes a first string indicating the image processing program and a second string indicating a content of image processing to be executed by the image processing program". The final operation confirmation image is an example of a specific image. The CPU executing S520 is an example of "cause a display to display a specific image indicating a context of image processing indicated by the second string in a case where it is determined that the text data includes the first string and the second string". The CPU executing S574 and S580 is an example of "instructing the image processing program indicated by the first string to execute image processing indicated by the second string in a case where an execution instruction is accepted". The final operation confirmation image data is an example of specific image data. The CPU executing S600 is an example of "receiving result information indicating an execution result of image processing indicated by a second string from the image processing program". The CPU executing S610 is an example of "causing the voice-recognition program to output the execution result indicated by the result information by sending the received result information to the voice-recognition program". The CPU executing S210 is an example of "creating a first string based on a similar character string similar to the first string in a case where it is determined that the first string is not included in the text data but the similar character string is included in the text data". The CPU executing S220 is an example of "causing the voice-recognition program to output the created first string by sending the created first string to the voice-recognition program". The CPU executing S250 is an example of "receiving, from the voice-recognition program, first use information indicating whether the created first string is usable". The CPU executing S574 and S580 is an example of "instructing the image processing program indicated by the created first string to execute the image processing indicated by the second string in a case where the received first use information indicates that the created first string is usable". The CPU executing S210 is an example of "creating the second string based on a similar character string similar to the second string in a case where it is determined that the second string is not included in the text data but the similar character string is included in the text data". The CPU executing S220 is an example of "causing the voice-recognition program to output the second string by sending the created second string to the voice-recognition program". The CPU executing S250 is an example of "receiving, from the voice-recognition program, second use information indicating whether the created second string is usable". The CPU executing S520 is an example of "causing a display to display a specific image indicating a context of image processing indicated by the created second string in a case where the received second use information indicates that the created second string is usable". The CPU executing S574 and S580 is an example of "instructing the image processing program indicated by the first string to execute the image processing indicated by the created second string in a case where an execution instruction for the image processing is accepted". The CPU executing S310 is an example of "creating a plurality of first candidate strings that are candidates for the first character string, in a case where it is determined that the first string is not included in the text data". The CPU executing S320 is an example of "causing the voice-recognition program to output the plurality of first candidate strings by sending the created plurality of first candidate strings to the voice-recognition program". The CPU executing S350 is an example of "receiving, from the voice-recognition program, selected first string information indicating a selected first string selected from the sent plurality of first candidate strings". The CPU executing S574 and 580 is an example of "instructing the image processing program indicated by the selected first string indicated by the received selected first string information to execute the image processing indicated by the second string". The CPU executing S310 is an example of "creating a plurality of second candidate strings that are candidates for the second string, in a case where it is determined that the second string is not included in the text data". The CPU executing S320 is an example of "causing the voice-recognition program to output the plurality of second candidate strings by sending the created plurality of second candidate strings to the voice-recognition program". The CPU executing S350 is an example of "receiving, from the voice-recognition program, selected second string information indicating a selected second string selected from the created plurality of second candidate strings". The CPU executing S520 is an example of "causing the display to display a specific image indicating a context of image processing indicated by the selected second string indicated by the received selected second string information". The CPU executing S574 and S580 is an example of "instructing the image processing program indicated by the first string to execute image processing indicated by the selected second string, in a case where execution instruction of the image processing is accepted". The CPU executing S420 is an example of "causing the voice recognition program to accept input of the first string by sending first request information for requesting input of the first string to the voice recognition program in a case where it is determined that the first string is not included in the text data". The CPU executing S450 is an example of "receiving the first string from the voice-recognition program". The CPU executing S574 and S580 is an example of "instructing the image processing program indicated by the received first string to execute image processing indicated by the second string". The CPU executing S420 is an example of "sending second request information for requesting input of the second string to the voice-recognition program in a case where it is determined that the second string is not included in the text data so as to cause the voice-recognition program to accept input of the second string". The CPU executing S450 is an example of "receiving the second string from the voice-recognition program". The CPU executing S520 is an example of "causing the display to display a specific image indicating a context of image processing indicated by the received second string". The CPU executing S574 and S580 is an example of "instructing the image processing program indicated by the first string to execute image processing indicating the received second string in a case where execution instruction of the image processing is accepted". The domains are examples of first information. The CPU executing S150 is an example of "obtaining first information indicating whether setting information to be used in the image processing indicated by the second string is included in the text data". The CPU executing S576 is an example of "extracting the setting information from the text data in a case where the first information indicates the text data includes the setting information".

What is claimed is:

1. A non-transitory computer-readable recording medium storing computer-readable instructions read by a controller of an information processing device in which an image processing program and a voice-recognition program have been installed, the computer-readable instructions being for intermediating communications between the image processing program and the voice-recognition program,
    the image processing program and the voice-recognition program having a format interpretable by the controller of the information processing device,
    the image processing program being for executing image processing,
    the voice-recognition program being for converting a voice inputted via a microphone of the information processing device to text data,
    wherein the computer-readable instructions for intermediating communications between the image processing program and the voice-recognition program, when executed by the controller of the information processing device, cause the information processing device to:
    obtain the text data from the voice-recognition program in a case where the voice-recognition program creates the text data;
    determine whether the obtained text data includes a first string indicating an instruction target that is instructed to execute the image processing and a second string indicating a content of image processing which is one of print and scan to be executed by the image processing program; and
    instruct the instruction target indicated by the first string to execute the print or scan indicated by the second string in a case where it is determined that the text data includes the first string and the second string and an execution instruction is accepted.

2. The non-transitory computer-readable recording medium as in claim 1, wherein the computer-readable instructions, when executed by the controller of the information processing device, further cause the information processing device to:

receive result information indicating an execution result of the print or scan indicated by the second string from the image processing program; and cause the voice-recognition program to output the execution result indicated by the result information by sending the received result information to the voice-recognition program.

3. The non-transitory computer-readable recording medium as in claim 1, wherein the computer-readable instructions, when executed by the controller of the information processing device, further cause the information processing device to:

create the first string based on a similar character string similar to the first string in a case where it is determined that the first string is not included in the text data but the similar character string is included in the text data;

cause the voice-recognition program to output the created first string by sending the created first string to the voice-recognition program;

receive, from the voice-recognition program, first use information indicating whether the created first string is usable; and instruct the image processing program having a name indicated by the created first string to execute the print or scan indicated by the second string in a case where the received first use information indicates that the created first string is usable.

4. The non-transitory computer-readable recording medium as in claim 1, wherein the computer-readable instructions, when executed by the controller of the information processing device, further cause the information processing device to:

create the second string based on a similar character string similar to the second string in a case where it is determined that the second string is not included in the text data but the similar character string is included in the text data;

cause the voice-recognition program to output the second string by sending the created second string to the voice-recognition program;

receive, from the voice-recognition program, second use information indicating whether the created second string is usable;

output a specific voice message indicating the print or scan indicated by the created second string in a case where the received second use information indicates that the created second string is usable; and instruct the image processing program having the name indicated by the first string to execute the print and scan indicated by the created second string in a case where an execution instruction for the image processing is accepted.

5. The non-transitory computer-readable recording medium as in claim 4, wherein the outputting of the specific voice message indicating the print or scan includes causing the voice-recognition program or the image processing program to output the specific voice message by sending specific data for outputting the specific voice message to the voice-recognition program or the image processing program.

6. The non-transitory computer-readable recording medium as in claim 1, wherein the computer-readable instructions, when executed by the controller of the information processing device, further cause the information processing device to:

create a plurality of first candidate strings that is candidates for the first character string, in a case where it is determined that the first string is not included in the text data;

cause the voice-recognition program to output the plurality of first candidate strings by sending the created plurality of first candidate strings to the voice-recognition program;

receive, from the voice-recognition program, selected first string information indicating a selected first string selected from the sent plurality of first candidate strings; and instruct the image processing program having a name indicated by the selected first string indicated by the received selected first string information to execute the print or scan indicated by the second string.

7. The non-transitory computer-readable recording medium as in claim 1, wherein the computer-readable instructions, when executed by the controller of the information processing device, further cause the information processing device to:

create a plurality of second candidate strings that is candidates for the second string, in a case where it is determined that the second string is not included in the text data;

causing the voice-recognition program to output the plurality of second candidate strings by sending the created plurality of second candidate strings to the voice-recognition program;

receive, from the voice-recognition program, selected second string information indicating a selected second string selected from the created plurality of second candidate strings;

output a specific voice message indicating the print or scan indicated by the selected second string indicated by the received selected second string information; and instruct the image processing program having a name indicated by the first string to execute the print or scan indicated by the selected second string, in a case where execution instruction of the image processing is accepted.

8. The non-transitory computer-readable recording medium as in claim 7, wherein the outputting of the specific voice message indicating the print or scan indicated by the selected second string includes causing the voice-recognition program or the image processing program to output the specific voice message by sending specific data for outputting the specific voice message to the voice-recognition program or the image processing program.

9. The non-transitory computer-readable recording medium as in claim 1, wherein the computer-readable instructions, when executed by the controller of the information processing device, further cause the information processing device to:

cause the voice recognition program to accept input of the first string by sending first request information for requesting input of the first string to the voice recognition program in a case where it is determined that the first string is not included in the text data;

receive the first string from the voice-recognition program; and instruct the image processing program having a name indicated by the received first string to execute the print or scan indicated by the second string.

10. The non-transitory computer-readable recording medium as in claim 1, wherein the computer-readable instructions, when executed by the controller of the information processing device, further cause the information processing device to:

send second request information for requesting input of the second string to the voice-recognition program in a case where it is determined that the second string is not included in the text data so as to cause the voice-recognition program to accept input of the second string; and receive the second string from the voice-recognition program;

output a specific voice message indicating the print or scan indicated by the received second string; and instruct the image processing program having a name indicated by the first string to execute the print or scan indicating the received second string in a case where execution instruction of the image processing is accepted.

11. The non-transitory computer-readable recording medium as in claim 10, wherein the outputting of the specific voice message indicating the print or scan indicated by the received second string includes causing the voice-recognition program or the image processing program to output the specific voice message by sending specific data for outputting the specific voice message to the voice-recognition program or the image processing program.

12. The non-transitory computer-readable recording medium as in claim 1, wherein the computer-readable instructions, when executed by the controller of the information processing device, further cause the information processing device to:

obtain first information indicating whether setting information to be used in the print or scan indicated by the second string is included in the text data; and extract the setting information from the text data in a case where the first information indicates the setting information is included in the text data, the instructing of the image processing program having the name indicated by the first string to execute the print or scan indicated by the second string includes instructing the image processing program to execute the print or scan according to the extracted setting information.

13. An information processing device, in which an image processing program and a voice-recognition program have been installed, the image processing program and the voice-recognition program having a format interpretable by a controller of the information processing device, the image processing program being for executing image processing, the voice-recognition program being for converting a voice inputted via a microphone of the information processing device to text data, the information processing device comprising:

the microphone;

the controller; and a main memory storing computer-readable instructions therein for intermediating communications between the image processing program and the voice-recognition program, the computer-readable instructions, when executed by the controller, causing the information processing device to:

obtain the text data from the voice-recognition program in a case where the voice-recognition program creates the text data;

determine whether the obtained text data includes a first string indicating an instruction target that is instructed to execute the image processing and a second string indicating a content of image processing which is one of print and scan to be executed by the image processing program; and instruct the instruction target indicated by the first string to execute the print or scan indicated by the second string in a case where it is determined that the text data includes the first string and the second string and an execution instruction is accepted.

14. A non-transitory computer-readable recording medium storing computer-readable instructions read by a controller of an information processing device, the information processing device comprising a communication interface configured to communicate with an external device in which an image processing program and a voice-recognition program have been installed, the computer-readable instructions being for intermediating communications between the image processing program and the voice-recognition program, the image processing program and the voice-recognition program having a format interpretable by the controller of the information processing device, the image processing program being for executing image processing, and the voice-recognition program being for converting a voice inputted via a microphone of the information processing device to text data, wherein the computer-readable instructions for intermediating communications between the image processing program and the voice-recognition program, when executed by the controller of the information processing device, cause the information processing device to:

cause the voice-recognition program to create the text data;

cause the image processing program to determine whether the created text data includes a first string indicating an instruction target that is instructed to execute the image processing and a second string indicating a content of image processing which is one of print and scan to be executed by the image processing program; and instruct the instruction target indicated by the first string to execute the print or scan indicated by the second string in a case where it is determined that the text data includes the first string and the second string and an execution instruction is accepted.

15. An information processing device comprising:

a microphone;

a controller;

a communication interface configured to communicate with an external device in which an image processing program and a voice-recognition program have been installed, the image processing program and the voice-recognition program having a format interpretable by a controller of the information processing device, the image processing program being for executing image processing, and the voice-recognition program being for converting a voice inputted via the microphone of the information processing device to text data; and a main memory storing computer-readable instructions therein for intermediating communications between the image processing program and the voice-recognition program, the computer-readable instructions, when executed by the controller, causing the information processing device to:

cause the voice-recognition program to create the text data;

cause the image processing program to determine whether the created text data includes a first string indicating an instruction target that is instructed to execute the image processing and a second string indicating a content of image processing which is one of print and scan to be executed by the image processing program; and instruct the instruction target indicated by the first string to execute the print or scan indicated by the second string in a case where it is determined that the text data includes the first string and the second string and an execution instruction is accepted.

* * * * *